United States Patent [19]

Noll et al.

[11] Patent Number: 4,789,718
[45] Date of Patent: Dec. 6, 1988

[54] POLYURETHANES SOLUBLE OR DISSOLVED IN AROMATIC HYDROCARBONS, A PROCESS FOR THEIR PREPARATION AND THEIR USE

[75] Inventors: Klaus Noll; Josef Pedain, both of Cologne; Manfred Schönfelder, Leverkusen, all of Fed. Rep. of Germany

[73] Assignee: Bayer Aktiengesellschaft, Leverkusen, Fed. Rep. of Germany

[21] Appl. No.: 730,136

[22] Filed: May 3, 1985

[30] Foreign Application Priority Data

May 11, 1984 [DE] Fed. Rep. of Germany ....... 3417475

[51] Int. Cl.$^4$ .................... C08G 18/08; C08G 18/16
[52] U.S. Cl. ........................................ 528/49; 528/65; 528/67
[58] Field of Search ............................. 528/49, 65, 67

[56] References Cited

U.S. PATENT DOCUMENTS

| | | |
|---|---|---|
| 3,344,121 | 9/1967 | Phelisse et al. ................ 260/75 |
| 3,753,953 | 8/1973 | Leeuwerik et al. ............. 528/65 |
| 4,021,505 | 5/1977 | Wang ............................... 525/509 |
| 4,058,506 | 11/1977 | Vaeth et al. ................ 260/75 NP |
| 4,331,778 | 5/1982 | Sommerfield et al. .......... 521/129 |
| 4,400,498 | 8/1983 | Konishi et al. ................. 528/65 |
| 4,401,801 | 8/1983 | Pedain et al. ................... 528/83 |
| 4,448,903 | 5/1984 | Tai-Ming-Liang et al. ..... 521/137 |

FOREIGN PATENT DOCUMENTS 1106958 5/1961 Fed. Rep. of Germany .
1106959 5/1961 Fed. Rep. of Germany .

OTHER PUBLICATIONS

Res. Discl. 1976, 148, 55 (Eng). Novel Isocyanate Containing Compositions, Process for Their Preparation and Polyurethanes Derived Therefrom.
Chemical Abstracts, Band 85, No. 144359b.

*Primary Examiner*—John Kight
*Assistant Examiner*—M. L. Moore
*Attorney, Agent, or Firm*—Gene Harsh; Joseph C. Gil; Thomas W. Roy

[57] ABSTRACT

The present invention is directed to substantially linear polyurethanes obtained from 1 mol of relatively high molecular weight macrodiols such as polyesters, polyethers and polycarbonates having a molecular weight of 400 to 5000, preferably about 500 to 3000, about 1.5 to 16.5 mols of aromatic diisocyanates, optionally about 0.01 to 1 mol of chain breaking agents in the form of compounds which are monofunctional in their reaction with isocyanates, and about 0.5 to 15 mols of low molecular weight, difunctional chain lengthening agents, characterized in that at least 10 mol-% of the chain lengthening agents is 2,2,4-trimethylpentanediol-(1,3) and the remaining chain lengthening agents, having molecular weights of 62 to 399 (preferably 62 to 250), are preferably diols.

The present invention also relates to a process for the preparation of these polyurethanes and to their use for the production of coatings on flexible or non-flexible substrates, wherein the coatings are optionally filled, preferably with magnetizable pigments, and are optionally cross-linked.

17 Claims, No Drawings

POLYURETHANES SOLUBLE OR DISSOLVED IN AROMATIC HYDROCARBONS, A PROCESS FOR THEIR PREPARATION AND THEIR USE

BACKGROUND OF THE INVENTION

1. Field of the Invention

This invention relates to polyurethane resins obtained from aromatic diisocyanates, which are soluble in apolar or slightly polar solvents, and to a process for their preparation from relatively high molecular weight dihydroxyl compounds, diisocyanates, diol chain lengthening agents and optionally monofunctional chain breaking agents wherein 2,2,4-trimethyl-pentanediol(1,3) is used as all or part of the chain-lengthening agent. This invention is also directed to the use of these polyurethanes for the production of films or coatings.

2. Description of the Prior Art

Linear polyurethanes obtained from dihydroxyl compounds and diisocyanates have long been known and numerously described in the literature. They generally consist of segmented high polymers in the form of chains built up of macrodiols, diisocyanates and low molecular weight chain lengthening agents. One class of these polymers includes the polyurethanes prepared from aromatic diisocyanates, in which the chain lengthening agents used consist almost exclusively of diols. Such polyurethanes are generally only soluble in solvents containing at least a proportion of highly polar substances, such as dimethylformamide, dimethylsulphoxide or N-methylpyrrolidone. Such solvents are not toxicologically and ecologically harmless, particularly when handled inexpertly, and require the use of costly installations for their recovery. Furthermore, they are unsuitable for use in the increasingly important field of lacquering synthetic resins since they unduly attack the surfaces of synthetic resin articles and to some extent even dissolve them. This results not only in changes in the nature of the surface (smoothness and gloss), but also in loss of dimensional stability or of certain structures (e.g. in the case of foams having an integrated non-cellular skin). For many fields of application, there is therefore presently a demand for the use of solvents which are non-corrosive and harmless in other respects, such as aromatic hydrocarbons, ketones and esters. Unfortunately, most of the "aromatic" polyurethanes are insoluble or not completely soluble in such solvents. There has therefore been no lack of attempts to modify these polyurethanes in some suitable manner to enable them to be completely dissolved in less polar solvents.

Thus, the aromatic polyurethanes disclosed in DAS No. 1,106,958 are soluble in methyl ethyl ketone or ethyl acetate if diols corresponding to the following general formula

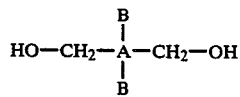

(A=alkylene, B=H or $C_1$–$C_5$ group) have been used for their synthesis. The resulting polyurethanes, however, only contain a limited proportion of diols, based on their macrodiol content (0.1 to 3 mol to every 1 mol) and the products obtained have insufficient hardness for many purposes of application. If the proportion of chain lengthening agent is increased, the polyurethanes obtained have satisfactory properties but their solubility in the above-mentioned solvents is insufficient.

DAS No. 1,106,959 discloses polyurethanes obtained from macrodiols and aromatic polyisocyanates which are chain lengthened with straight chained diols having 2 to 10 carbon atoms and are soluble in DMF, cyclohexanone, tetrahydrofuran or dioxane. In this case, only 2 mol of chain lengthening agent may be used to 1 mol of macrodiol if clear solutions are still to be obtained.

According to DAS No. 1,301,124, similar polyurethanes are prepared in boiling chlorinated aromatic compounds such as mono- or dichlorobenzene and then obtained as solid product by precipitation from the liquid reaction mixtures.

Lastly, in DAS No. 2,442,763 there are disclosed linear polyurethanes obtained from macrodiols, 4,4-diisocyanato-diphenylmethane and its derivatives and low molecular weight, branch chained diols, in which the last component is preferably 2,2-dimethyl-propanediol(1,3) ("neopentyl glycol") and which are distinguished by the fact that in spite of their high content in chain lengthening agent (3.5 to 15 mol of neopentyl glycol to 1 mol of macrodiol), they are soluble in cyclic ethers such as tetrahydrofuran or dioxane and cyclic ketones such as cyclohexanone. Very hard coatings can be produced with these polyurethanes.

Solvents such as cyclic ethers or ketones offer some advantages over highly polar solvents such as dimethyl formamide, dimethyl sulphoxide or N-methylpyrrolidone. They are less corrosive to synthetic resins and physiologically less harmful. On the other hand, cyclic ethers have a tendency to form dangerous peroxides, and polyurethanes obtained from these ethers and cyclic ketones are not universally suitable for use on synthetic resins. Although such solutions may be blended with solvents such as non-cyclic ketones, esters or aromatic compounds, this does not eliminate their corrosive action on synthetic resins.

Only polyurethanes with a low chain lengthening agent content have therefore hitherto been soluble in these very useful aromatic hydrocarbons as indicated above. For many fields of application, these polyurethanes are unusable because they have insufficient hardness. It is precisely for particularly delicate substrates such as carrier tapes for magnetic recording materials that it would be particularly desirable to be able to apply hard, resistant polyurethanes from a solvent or solvent mixture containing aromatic hydrocarbons.

It was therefore an object of the present invention to provide polyurethanes with great hardness and mechanical wear resistance which could be applied from a solvent or mixture of solvents containing an aromatic hydrocarbon and would be suitable for use on substrates which are sensitive to solvents.

It has now surprisingly been found that such polyurethanes may be obtained by using 2,2,4-trimethylpentanediol-(1,3)

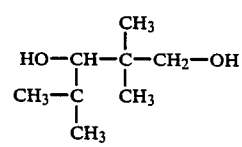

as chain lengthening agent in a polyurethane based on macrodiols, aromatic diisocyanates and chain lengthening agents.

The polyurethanes thus obtained may be dissolved in purely aromatic hydrocarbons, in ketones and optionally esters or in any mixtures of these solvents.

Furthermore, these polyurethanes may be prepared from the start in these solvents or mixtures thereof. Clear, viscous solutions which are free from gelled particles and have normal flow properties are obtained in both cases. It is surprising to find that in spite of the excellent solubility of these polyurethanes, especially in aromatic hydrocarbons, the films obtained from them do not differ markedly in their surface hardness from films of analogous polyurethanes prepared according to the known art from 2,2-disubstituted 1,3-propanediols. As already mentioned above, it is precisely these properties of surface hardness which in the past had to be forfeited if improved solubility was to be obtained.

SUMMARY OF THE INVENTION

The present invention is directed to substantially linear polyurethanes obtained from 1 mol of relatively high molecular weight macrodiols such as polyesters, polyethers and polycarbonates having a molecular weight of 400 to 5000, preferably about 500 to 3000, about 1.5 to 16.5 mols of aromatic diisocyanates, optionally about 0.01 to 1 mol of chain breaking agents in the form of compounds which are monofunctional in their reaction with isocyanates, and about 0.5 to 15 mols of low molecular weight, difunctional chain lengthening agents, characterized in that at least 10 mol-% of the chain lengthening agents is 2,2,4-trimethylpentanediol-(1,3) and the remaining chain lengthening agents, having molecular weights of 62 to 399 (preferably 62 to 250), are preferably diols.

The present invention also relates to a process for the preparation of polyurethanes from macrodiols such as polyesters, polycarbonates and polyethers, aromatic diisocyanates, optionally chain breaking, monofunctional compounds and chain lengthening agents by reacting at temperatures of about 50 Ⓡ to 180° C., preferably about 60° to 120° C., (i) 1 mol of a macrodiol having a molecular weight of 400 to 5000, preferably about 500 to 3000,
(ii) about 0.5 to 15 mol of difunctional hydroxyl compounds having a molecular weight of from 62 to 399 containing
(ii/a) $\geq$10 mol-% to 100 mol-%, preferably $\geq$40 mol-%, of 2,2,4-trimethyl-pentanediol-(1,3) and
(ii/b) up to 90 mol-% of other chain lengthening agents having molecular weights of 62 to 399, preferably diols which may optionally contain minor quantities of diamines, in particular isophorone diamine,
(iii) optionally about 0.01 to 1 mol of monofunctional compound having reactive end groups, preferably a compound with 1 to 18 carbon atoms containing OH, NH, NH$_2$, —NOH or NCO groups, most preferably a monohydroxy compound and
(iv) about 1.5 to 16.5 mol of an aromatic diisocyanate
(v) optionally in the presence of a solvent or solvent mixture which preferably contains aromatic hydrocarbons.

Lastly, the invention relates to the use of the polyurethanes having the composition claimed and obtained by the claimed method of preparation for the production of coatings on flexible substrates, which coatings are optionally filled, preferably with magnetizable pigments, and are optionally cross-linked.

DETAILED DESCRIPTION OF THE INVENTION

Suitable compounds within the molecular weight range of about 400 to 5000, preferably about 500 to 3000 for the process according to the invention, containing isocyanate reactive end groups and difunctional in isocyanate polyaddition reactions include in particular dihydroxyl compounds (macrodiols) such as 1. the known dihydroxyl polyesters used in polyurethane chemistry, obtained from dicarboxylic acids such as succinic acid, adipic acid, suberic acid, azelaic acid, sebacic acid, phthalic acid, isophthalic acid, terephthalic acid, tetrahydrophthalic acid etc. and diols such as ethylene glycol, propane diol-(1,2), propanediol-(1,3), diethylene glycol, butanediol-(1,4), hexanediol-(1,6), octanediol-(1,8), neopentyl glycol, 2-methylpropanediol-(1,3) or the various isomeric bis-hydroxymethyl-cyclohexanes;

2. the polylactones known in polyurethane chemistry, e.g. the polymers of caprolactone started on the above-mentioned dihydric alcohols;

3. the polycarbonates known in polyurethane chemistry, such as those obtained, for example, by the reaction of the above-mentioned diols with diaryl carbonates or phosgene;

4. the known polyethers of polyurethane chemistry, e.g. polymers or copolymers of tetrahydrofuran, styrene oxide, propylene oxide, ethylene oxide, butylene oxide or epichlorohydrin obtained with the aid of divalent starter molecules such as water, the above mentioned diols or amines containing two NH bonds. A certain proportion of ethylene oxide may be used provided the polyether used contains not more than a maximum of about 10% by weight of ethylene oxide. In general, however, the polyethers used are obtained without the aid of ethylene oxide.

Diisocyanates (iv) suitable for the process according to the invention correspond to the general formula Q(NCO)$_2$ in which Q represents a divalent aromatic group having 6 to 18 carbon atoms and one or more nuclei and in which the isocyanate groups are directly attached to the ring system or systems. Typical examples are: 1,5-diisocyanatonaphthalene, 2,4-and 2,6-diisocyanato-toluene and mixtures of these isomers, and 4,4'-, 2,4'- and 2,2'-diisocyanatodiphenylmethane and derivatives thereof in which the phenyl rings are substituted one or more times with alkyl groups. Diphenylmethane diisocyanates are particularly preferred.

Chain breaking monofunctional compounds (iii) may optionally be used to limit the molecular weight of the polyurethanes according to the invention. These compounds may in principle be monofunctional isocyanates, but monofunctional hydroxyl compounds are preferred in practice. Primary and secondary monoamines are also suitable for this purpose, but less preferred. Suitable monohydroxyl compounds include aliphatic alcohols such as butanol, hexanol, ethylhexanol and stearyl alcohol, but other hydroxyl compounds may also be used, e.g. oximes such as butanone oxime. These chain breaking agents may be used in quantities of greater than about 0.01 mol or in quantities of up to about 1 mol if short chained oligourethanes are to be prepared, the quantities being based on 1 mol of the macrodiol.

The chain lengthening agent 2,2,4-trimethylpentanediol-(1,3) (ii/a) may be partly replaced by other diols (ii/b), such as ethylene glycol, butanediol-(1,4), butanediol-(1,3), hexanediol-(1,6), 2,2-dimethylpropanediol, undecanediol-(1,3) or 1-hydroxy-3-hydroxymethyl-3,3,5-trimethylcyclohexane. The proportion of 2,2,4-trimethylpentanediol-(1,3) in the chain lengthening agent, however, amounts to at least 10 mol-%, preferably $\geq$40 mol-%. Polyurethanes in which the chain lengthening agent contains $\geq$75 mol-% of trimethyl-pentanediol and up to 25 mol-% of other diols (ii/b) are particularly preferred. Minor quantities of isophorone diamines may optionally be included in (ii/b) for chain lengthening.

The quantity of diols (ii) to be used may be about 0.5 to 15 mol per mol of macrodiol (i), depending on whether the polyurethane according to the invention is required to be very soft or very hard or adjusted to any intermediate value.

The polyurethanes according to the invention may be prepared in the presence or absence of solvent. In either case, the mixture of components (i), (ii) and optionally (iii) may be reacted with a stoichiometric quantity of the diisocyanate (iv). Alternatively, a so-called prepolymer may first be formed from (i) and (iv), and this prepolymer may then be reacted with the chain lengthening agent (ii), and the chain breaking agent (iii) may optionally be added thereafter or at the same time. Lastly, when no chain breaking agent is used, it is generally possible to use either an excess or subequivalent quantity of diisocyanate, which in either case may be as much as 10% and is preferably up to 5%, based on the stoichiometric quantity, calculated from the sum of all the hydroxyl components. A subequivalent quantity is preferred.

If no solvent is used, it is advisable to employ the one-shot process. In this process, all the components taking part in the reaction are mixed together at a slightly elevated temperature (about 50° C.) and poured into a container which has optionally been treated with mold release agent. The mixture may then be tempered at about 60° to 180° C., preferably about 80° to 150° C., a treatment which may take about 6 to 12 hours. After solidification and cooling, the cast polyurethane may be broken up and dissolved.

Both the one-shot process and the prepolymer process may be carried out in solution. The former process is advantageously carried out by introducing the hydroxyl component into the reaction vessel and reacting this stepwise with portions of the diisocyanate with heating. During this process, the viscosity of the mixture rises sharply but may be lowered by portion-wise addition of one or more solvents.

The above described prepolymer process may also be carried out in solution.

Aromatic hydrocarbons are particularly suitable solvents for dissolving the polyurethanes or carrying out the process according to the invention. These solvents include toluene, the various isomeric xylenes, ethylbenzene, the diethylbenzene isomers and commercial mixtures of aromatic compounds obtained by the fractionation of petroleum. They may, if desired, be mixed with other solvents, preferably with solvents which are also only slightly polar such as ketones or esters. Among the ketones, acyclic ketones having up to 8 carbon atoms are preferred, in particular acetone, methyl ethyl ketone, methyl isobutyl ketone and methyl amyl ketone. Cyclic ketones such as cyclohexanone may also be used but are less preferred for the reasons previously indicated. The esters used may be relatively low boiling esters obtained from $C_1$- to $C_6$-carboxylic acids and $C_1$- to $C_8$-alcohols (but the sum of carbon atoms of carboxylic acid and alcohol should not exceed 10), for example, ethyl acetate, butyl acetate, 2-ethylhexyl acetate, etc. Carboxylic acid esters containing ether groups obtained by the reaction of alkoxy ethylene glycols and alkoxy propylene glycols with carboxylic acids are less preferred.

The aromatic hydrocarbons may contain up to about 75%, preferably up to about 50% of the above mentioned ketones or esters.

It is possible but not preferred to use more highly polar or highly polar solvents, such as the cyclic ethers already mentioned above and solvents such as dimethylsulphoxide, dimethylformamide and N-methylpyrrolidone. For reasons which will be explained later, the inclusion of $C_1$–$C_8$-alcohols, in particular secondary alcohols (such as isopropanol, isobutanol) or tertiary alcohols (such as tert.-butanol or tert.-amyl alcohol) as solvents is possible in principle but not desirable in practice.

The polyurethanes according to the invention may be prepared in solution or dissolved to form solutions having a concentration of about 20 to 90% and a viscosity range extending from a few 100 to several 10,000 mPa.s. The viscosity depends mainly on the concentration and molecular weight of the polyurethanes.

The solutions may be applied to substrates in known manner by spraying, roller application, casting, dip coating or spread coating, optionally after the addition of pigments, levelling and matting agents and other known lacquer auxiliaries. Suitable substrates, apart from the preferred flexible or non-flexible, foamed or non-cellular synthetic resins, include coated and uncoated textile structures, leather, paper, cardboard, wood, mineral substances and metals. According to a preferred embodiment of the present invention, the polyurethane solution, filled with magnetizable particles such as $\gamma$-ferrite or magnetite, optionally doped, e.g. with cobalt, or filled with pure iron particles, is applied by casting to a laminar support such as polyester foils. These coated foils may be used to produce magnetic information carriers in the form of discs or tapes suitable for the recording of audio, video or computer information. In the production of such magnetic tapes, great importance is attached to high abrasion resistance and resistance to cleaning agents such as alcohols.

After the polyurethanes according to the invention have completed their reaction and formed films, they have only limited resistance to solvents owing to their substantially linear structure. Where required, the addition of cross-linking compounds as known in this art is advisable. These cross-linking compounds may be either resin components which can be activated by heat, such as melamine or urea formaldehyde resins which have been partially or completely etherified with monohydric alcohols such as methanol or butanols, or melamine-hexamethanol ethers, blocked polyisocyanates, isocyanate prepolymers or polyaziridine compounds.

If the substrates are heat sensitive, subsequent cross-linking with unblocked polyisocyanates is frequently carried out. This cross-linking is effected by atmospheric moisture and may extend over several days. This means that although the dried film is ready for use and further processing, its ultimate strength is only obtained after a certain time.

Such polyisocyanates include reaction products of diisocyanates such as 2,4- and 2,6-diisocyanatotoluene, 1,6-diisocyanatohexane, 1-isocyanato-3-isocyanatomethyl-3,5,5-trimethylcyclohexane or 4,4'-diisocyanatodicyclohexylmethane or mixtures thereof with triols such as trimethylolpropane, trimethylolethane, hexanetriol or glycerol, or polyisocyanates containing isocyanurate groups such as those obtained from the above mentioned diisocyanates, and the known biuret polyisocyanates and allophanate polyisocyanates.

When such cross-linking agents containing free isocyanate groups are used, it is unadvisable, as already mentioned above, to use alcohols as cosolvents, since these rapidly render the cross-linking agent ineffective.

The invention is further illustrated but is not intended to be limited by the following examples in which all parts and percentages are by weight unless otherwise specified.

EXAMPLES

Example 1

900 parts of a butanediol polyadipate (OH number 124) and 438 parts of 2,2,4-trimethyl-pentanediol-)1,3) were melted at about 50° C. and 975 parts of 4,4'-diisocyanatodiphenylmethane (MDI) were added. The mixture was heated to 80° C. and stirred, and the viscosity slowly increased. To render the mixture more readily stirrable, 200-part portions of toluene were gradually added until the concentration, after the addition of 3400 parts of toluene, amounted to 40.5%. The viscosity was then gradually adjusted to 1000 mPa.s after the addition of, in each case, 2 parts of MDI. After cooling to 21° C., the viscosity increased to 13000 mPa.s/21° C.

The solution obtained was clear and may be further diluted with toluene, xylene or methyl ethyl ketone. After drying, a film applied wet in a thickness of about 100 μm was soft and elastic.

Example 2

2600 parts of a diethylene glycol polyadipate (OH number 43), 148 parts of 2,2,4-trimethylpentanediol-(1,3), and 208 parts of neopentyl glycol were melted at about 50° C. and 1050 parts of 4,4'-diisocyanatodiphenylmethane (MDI) were added. The mixture was heated to 80° C. and stirred, and the viscosity slowly increasd. 7010 parts of toluene were then gradually added and the reaction was continued until the isocyanate content was constant. (As the amount is small, it can only be ascertained by IR spectroscopy.) 2100 parts of methyl ethyl ketone (MEK) were then added and the solution was cooled to room temperature where it had a viscosity of 1500 mPa.s. A solution was then prepared from 34 parts of 1-amino-3-aminomethyl-3,5,5-trimethyl-cyclohexane (IPDA) and 230 parts of MEK, and a sufficient amount of this solution was then slowly added to the polymer solution with stirring until the final viscosity was 15000 mPa.s.

A clear, 30% solution of the polyurethane in toluene/MEK 3:1 was obtained. A film obtained after wet application to a thickness of 100 μm and drying was clear, soft and highly stretchable.

Example 3

(Comparison example)

A polyurethane solution having a viscosity of about 9000 mPa.s/25° C. was obtained by the procedure of Example 2 from 2600 parts of diethylene glycol polyadipate (OH number 43), 312 parts of neopentylglycol, 1050 parts of MDI, 34 parts of IPDA, 6930 parts of toluene and 2310 parts of MEK. The solution was cloudy since the polyurethane was not completely soluble in the solvent.

Example 4

2600 parts of the polyester diol described in Example 2 and 1460 parts of 2,2,4-trimethyl-pentanediol-(1,3) were melted at 50° C. and mixed with 2600 parts of 4,4'-diisocyanato-diphenylmethane (MDI). The temperature was raised to 80° C. and the mixture was stirred. As the viscosity gradually increased, a total of 10120 parts of toluene was added portion-wise. As further 20-part portions of MDI were added, the viscosity was gradually raised to about 2000 mPa.s. The mixture was then diluted with 2530 parts of methyl ethyl ketone and cooled.

A clear, 35% solution in toluene/methyl ethyl ketone (4:1) having a viscosity of 8000 mPa.s/25° C. was obtained.

A clear polyurethane film which was very hard, but still flexible, was obtained from this solution.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A substantially linear polyurethane which is soluble in aromatic hydrocarbons or mixtures containing aromatic hydrocarbons and comprises the reaction product of
   (i) 1 mol of a macrodiol having a molecular weight of 400 to 5000,
   (ii) about 0.5 to 15 mols of a chain lengthening agent having a molecular weight of 62 to 399 wherein 10 to 100 mol-% of said chain lengthening agent is 2,2,4-trimethylpentane-diol-(1,3),
   (iii) optionally about 0.01 to 1 mol of a chain breaking compound which is monofunctional in the isocyanate polyaddition reaction and
   (iv) about 1.5 to 16.5 mol of an organic polyisocyanate which consists essentially of an aromatic diisocyanate.

2. The polyurethane of claim 1 wherein said chain lengthening agent contains 40 to 100 mol-% of 2,2,4-trimethylpentanediol-(1,3) and up to 60 mol-% of other diols.

3. The polyurethane of claim 1 wherein said chain lengthening agent contains 75 to 100 mol-%, of 2,2,4-trimethylpentanediol-(1,3) and up to 25 mol-% of other diols.

4. The polyurethane of claim 1 wherein said macrodiol is a polyester and/or polyether diol.

5. The polyurethane of claim 4 wherein said chain lengthening agent contains 75 to 100 mol-% of 2,2,4-trimethylpentanediol-(1,3) and up to 25 mol-% of other diols.

6. A process for the preparation of a linear polyurethane which is soluble in aromatic hydrocarbons or mixtures containing aromatic hydrocarbons which comprises reacting at temperatures of about 50° to 180° C.
   (i) 1 mol of a macrodiol having a molecular weight of 400 to 5000,
   (ii) about 0.1 to 15 mol of a difunctional chain lengthening agent having a molecular weight of 62 to 399 wherein 10 to 100 mol-% of said chain lengthening agent is 2,2,4-trimethylpentanediol(1,3), and (iii) optionally about 0.1 to 1 mol of a chain breaking compound which is monofunctional in the polyisocyanate polyaddition reaction with (iv) about 1.5 to 16.5 mol of an organic polyisocyanate which consists essentially of an aromatic diisocyanate, (v) optionally in the presence of a solvent or solvent mixture containing an aromatic hydrocarbon.

7. The process of claim 6 wherein said macrodiol is a polyester and/or polyether diol.

8. The process of claim 6 wherein said chain lengthening agent contains up to about 90 mol-% of other diols.

9. The process of claim 6 wherein said chain breaking compound has 1 to 18 carbon atoms.

10. A process for the production of a coated substrate which comprises coating a flexible or non-flexible substrate with the polyurethane of claim 1.

11. The process of claim 10 wherein said polyurethane is pigmented with magnetizable pigments.

12. The process of claim 10 wherein said polyurethane is applied in the form of a solution in an aromatic hydrocarbon or in a solvent mixture containing an aromatic hydrocarbon.

13. The process of claim 10 wherein said polyurethane is applied in the form of a solution in an aromatic hydrcarbon or in a solvent mixture containing an aromatic hydrocarbon.

14. The process of claim 10 wherein said polyurethane is cross-linked with a melamine hexamethylol ether, an unblocked or blocked polyisocyanate, an isocyanate prepolymer, a polyaziridine compound or a melamine or urea formaldehyde resin which is partially or completely etherified with a monohydric alcohol.

15. The process of claim 11 wherein said polyurethane is cross-linked with a melamine hexamethylol ether, an unblocked or blocked polyisocyanate, an isocyanate prepolymer, a polyaziridine compound or a melamine or urea formaldehyde resin which is partially or completely etherified with a monohydric alcohol.

16. The process of claim 12 wherein said polyurethane is cross-linked with a melamine hexamethylol ether, an unblocked or blocked polyisocyanate, an isocyanate prepolymer, a polyaziridine compound or a melamine or urea formaldehyde resin which is partially or completely etherified with a monohydric alcohol.

17. The process of claim 13 wherein said polyurethane is cross-linked with a melamine hexamethylol ether, an unblocked or blocked polyisocyanate, an isocyanate prepolymer, a polyaziridine compound or a melamine or urea formaldehyde resin which is partially or completely etherified with a monohydric alcohol.

* * * * *